(12) United States Patent
Magatti

(10) Patent No.: US 11,517,150 B2
(45) Date of Patent: Dec. 6, 2022

(54) MULTIPURPOSE BEVERAGE PREPARATION MACHINE AND ELECTRONIC DEVICE FOR CONTROLLING THE SAME

(71) Applicant: NESTEC S.A., Vevey (CH)

(72) Inventor: Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 423 days.

(21) Appl. No.: 16/308,855

(22) PCT Filed: Jun. 13, 2017

(86) PCT No.: PCT/EP2017/064349
§ 371 (c)(1),
(2) Date: Dec. 11, 2018

(87) PCT Pub. No.: WO2017/216133
PCT Pub. Date: Dec. 21, 2017

(65) Prior Publication Data
US 2019/0307287 A1    Oct. 10, 2019

(30) Foreign Application Priority Data

Jun. 13, 2016    (EP) .................................. 16174211

(51) Int. Cl.
*B22C 5/00*    (2006.01)
*A47J 43/046*    (2006.01)
(Continued)

(52) U.S. Cl.
CPC ............. *A47J 43/046* (2013.01); *A47J 31/44* (2013.01); *A47J 31/52* (2013.01); *A47J 31/521* (2018.08);
(Continued)

(58) Field of Classification Search
CPC ... A47J 43/046; A47J 31/5253; A47J 43/0716
See application file for complete search history.

(56) References Cited

U.S. PATENT DOCUMENTS

| | | | | |
|---|---|---|---|---|
| 4,137,834 A * | 2/1979 | Uibel | ..................... | A47J 36/165 99/348 |
| 6,223,652 B1 * | 5/2001 | Calia | ..................... | A47J 19/027 241/73 |
| 7,878,701 B2 * | 2/2011 | Stephens | ............... | A47J 43/044 366/145 |
| 2002/0176320 A1 * | 11/2002 | Wulf | ..................... | A47J 43/085 366/205 |

(Continued)

FOREIGN PATENT DOCUMENTS

| | | |
|---|---|---|
| CN | 101641039 A | 2/2010 |
| CN | 202843328 U | 4/2013 |

(Continued)

OTHER PUBLICATIONS

China Patent Office Communication for Application No. 201780033088. 9, dated Jun. 21, 2021, 12 pages.

*Primary Examiner* — Anshu Bhatia
*Assistant Examiner* — Gregory Y Huan
(74) *Attorney, Agent, or Firm* — K&L Gates LLP

(57) ABSTRACT

A multipurpose beverage preparation machine includes a beverage preparation chamber for receiving a liquid, a processor for processing the beverage in the beverage preparation chamber, a motor configured for driving the processor in the beverage preparation chamber, a heater configured for heating the liquid in the beverage preparation chamber, a control unit operable to execute a beverage preparation process comprising control of the motor and the heater, the control unit being coupled to a network interface of the machine to receive beverage process parameters from an external electronic device, wherein the processor comprises at least one foaming insert and/or at least one support insert for supporting solid ingredients, which are selectively and removably positioned within the beverage preparation chamber and wherein the control unit is configured for (Continued)

actuating the motor and the heater based on at least a part of the received process parameters.

10 Claims, 12 Drawing Sheets

(51) Int. Cl.
    *A47J 31/52*           (2006.01)
    *A47J 43/07*           (2006.01)
    *A47J 31/44*           (2006.01)

(52) U.S. Cl.
    CPC ....... *A47J 31/5253* (2018.08); *A47J 43/0716* (2013.01)

(56) References Cited

U.S. PATENT DOCUMENTS

| | | | |
|---|---|---|---|
| 2008/0257168 A1* | 10/2008 | Wolfe | A47J 27/002 |
| | | | 99/348 |
| 2011/0232506 A1 | 9/2011 | Cai | |
| 2016/0055599 A1 | 2/2016 | Illy et al. | |

FOREIGN PATENT DOCUMENTS

| | | | |
|---|---|---|---|
| CN | 203762937 U | 8/2014 | |
| WO | 2004064585 | 8/2004 | |
| WO | 2015135031 | 9/2015 | |
| WO | 2015138961 | 9/2015 | |
| WO | WO-2015135031 A1 * | 9/2015 | ............. A47J 43/04 |
| WO | 2015148089 | 10/2015 | |

* cited by examiner

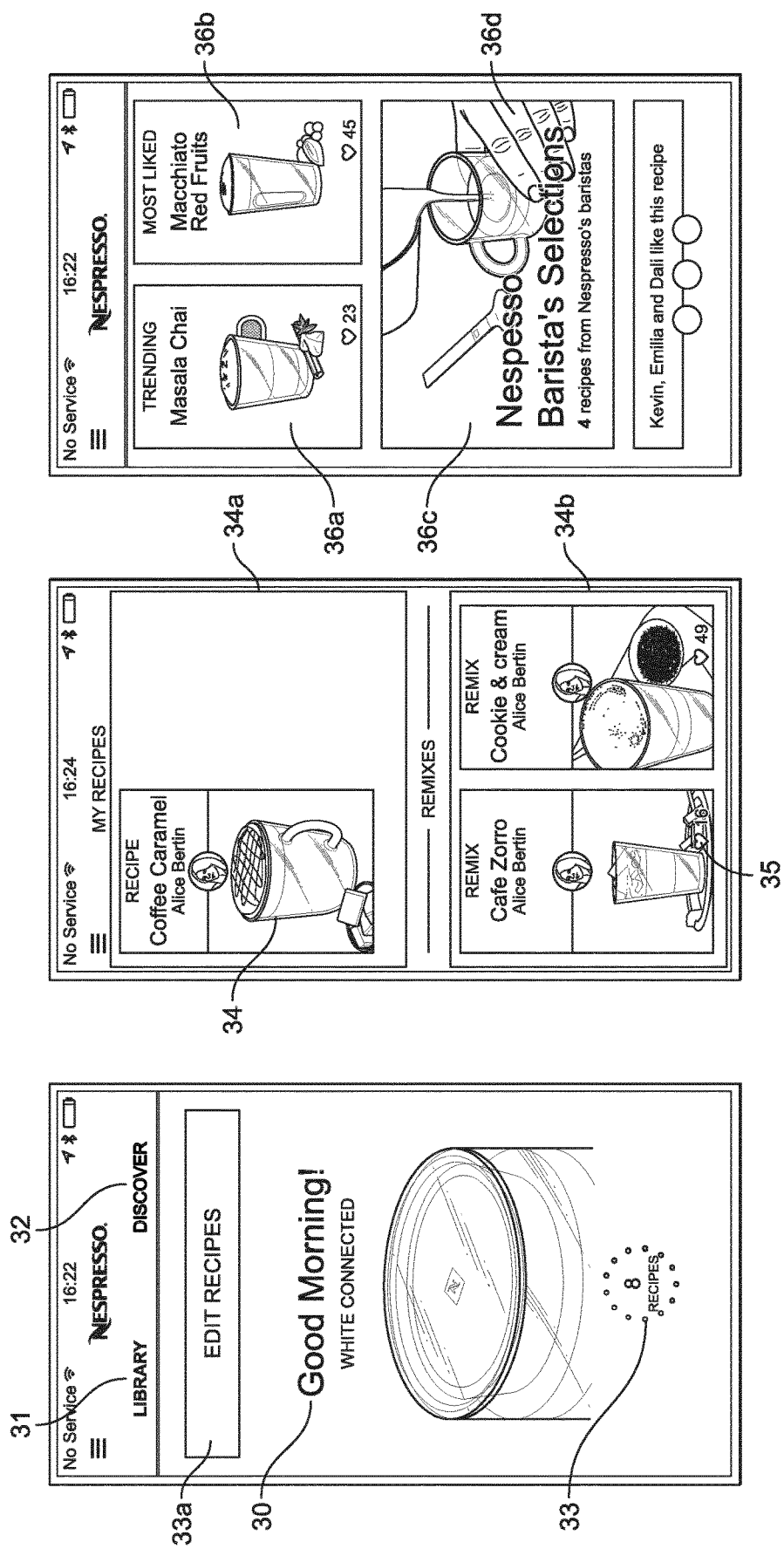

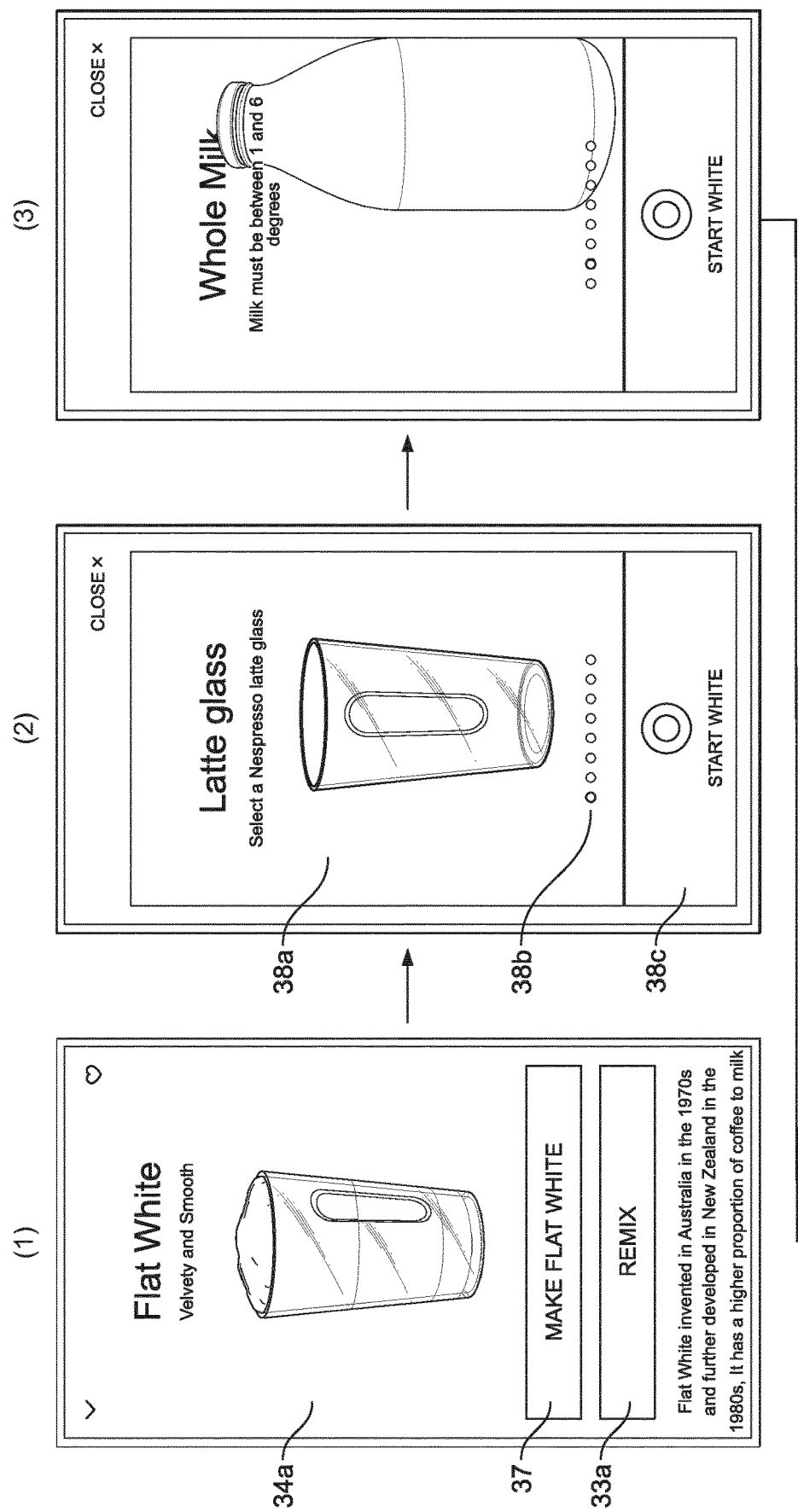

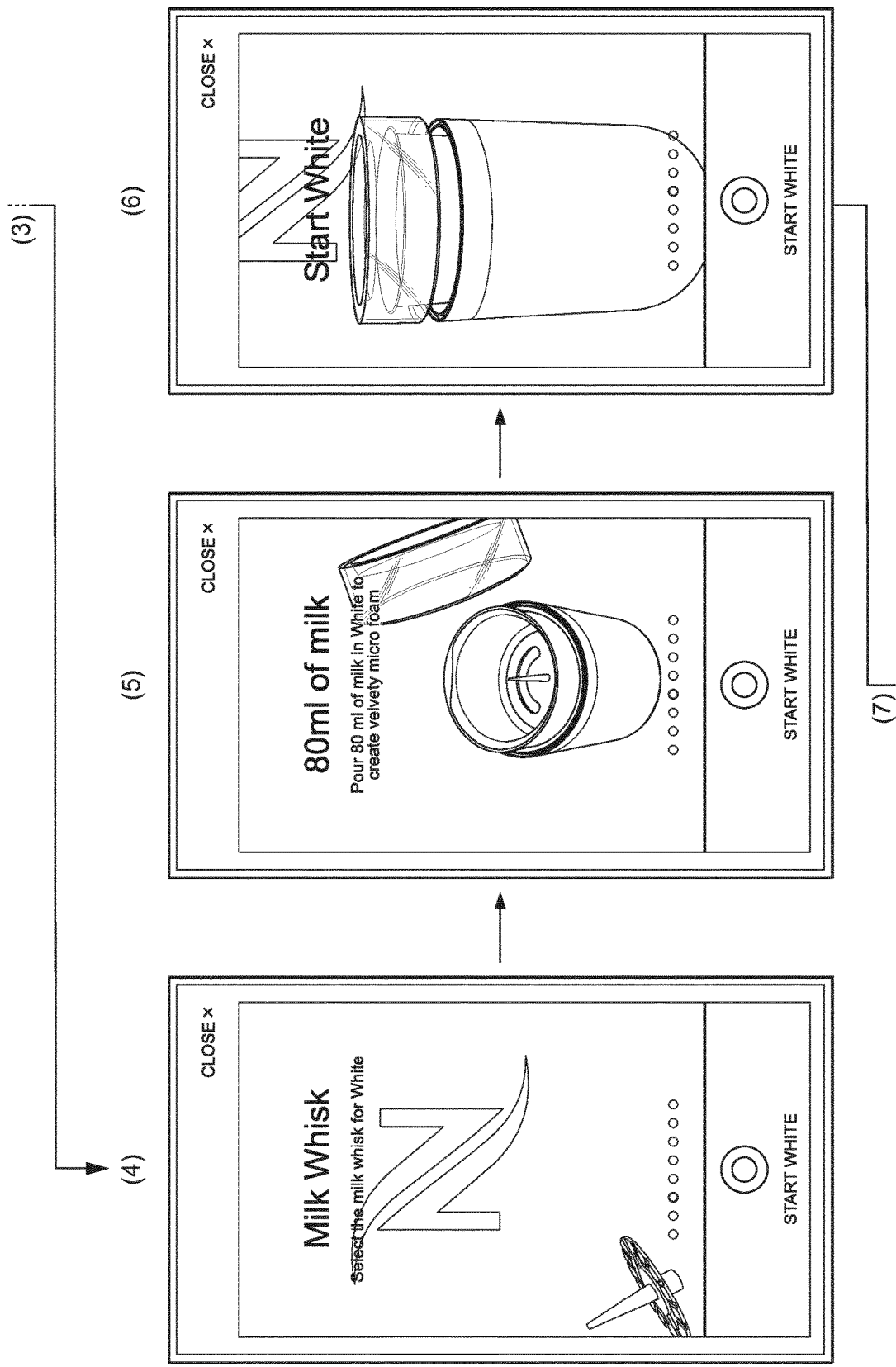

MULTIPURPOSE BEVERAGE PREPARATION MACHINE AND ELECTRONIC DEVICE FOR CONTROLLING THE SAME

CROSS REFERENCE TO RELATED APPLICATIONS

The present application is a National Stage of International Application No. PCT/EP2017/064349, filed on Jun. 13, 2017, which claims priority to European Patent Application No. 16174211.9, filed on Jun. 13, 2016, the entire contents of which are being incorporated herein by reference.

FIELD OF THE INVENTION

The field of the invention pertains to machines for preparing by mixing and/or homogenising a food substance, such as frothing milk or a milk-containing substance and for conveniently preparing a variety of different beverages.

BACKGROUND OF THE INVENTION

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

A convenient appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimize circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

Co-pending European patent application 15194722.3 relates to a beverage heating, mixing and drinking device comprising a drinking container, a mixing device, a motor cooperating the mixing device, a heating device, a temperature sensor configured for measuring the temperature of a liquid contained in the container and a control system operable to execute a beverage preparation process comprising control of the heating device and the mixing device; the control system comprising a communication interface to receive beverage preparation process information from a mobile device.

Even with these improvements the preparation of a beverage with such devices is not optimal because the devices of the state of the art cannot set the optimal process parameters according to the taste of the consumer and according to the nature of the beverage ingredient introduced in the container. Instead default parameters are usually set in order to enable the preparation of different beverages, which default values are however limited and do not always properly match the desired taste of the resulting beverage.

Further, there is an increasing demand for conveniently preparing a large variety of different beverage recipes which are only doable if they are executed by a so-called "professional barista". These recipes can be such as cappuccino, latte macchiato, Viennese coffee, iced coffee, hot chocolate, or the like with such beverage preparation machine. Thereby, the consumer should ideally be able to conveniently individualize the resulting beverage and its characteristics, such as in particular the beverage texture characteristic, for example, whether the beverage is more liquid or foamy or is lighter or denser.

For example, besides the well-known "Cappuccino", the consumer may wish to conveniently prepare also a so-called "Flat white", which consists in a single or double shot espresso and milk. Thereby, the milk of a "Flat white" is more velvety, i.e. less aerated than in a conventional cappuccino such that the coffee is allowed to dominate the flavor while being supported by the milk. This may be obtained by minimally aerating the milk during beverage preparation while the milk for a cappuccino is more aerated.

A convenient and easy preparation of such beverages appears however not possible with the known beverage preparation machines and without significantly increasing the complexity and thus negatively affecting the usability of the machine, e.g. by provision of a complex user interface at the machine.

It is therefore an aim of the present invention to provide an enhanced multipurpose beverage preparation machine and a method of operating the same, which enables the preparation of a multitude of individualized beverages, while at the same time providing enhanced user guidance and convenience.

The present invention seeks to address the above-described problem. The invention also aims at other objects and particularly the solution of other problems as will appear in the rest of the present description.

SUMMARY OF THE INVENTION

In a first aspect, the invention relates to a multipurpose beverage preparation machine comprising:
- a beverage preparation chamber for receiving a liquid,
- processing means for processing the beverage in the chamber,
- a motor configured for driving the processing means,
- a heating means configured for heating a liquid in the beverage preparation chamber,
- a control unit operable to execute a beverage preparation process comprising control of the motor and the heating means, the control unit being coupled to a network interface of the machine to receive beverage process parameters from an external electronic device, wherein the processing means comprises at least one foaming insert and/or at least one support insert for supporting solid ingredient(s) in liquid; which is or are selectively and removably positioned or positionable within the beverage preparation chamber, and wherein the control unit is configured for actuating the motor and the heating means based on at least a part of the received process parameters.

Preferably, the processing means comprises at least one foaming insert and at least one support insert; each being removably insertable within the beverage preparation chamber.

Due to the provided network interface, the multipurpose beverage preparation machine may be connected to the external electronic device over a network connection such as to control the control unit of the beverage preparation machine and in particular control the motor and the heating means during the beverage preparation process. Accordingly, a complex user interface at the machine is prevented and the machine may be conveniently controlled via a dedicated external electronic device such as a handheld device, e.g. a smartphone, a tablet or a stand-alone control unit connectable to the beverage preparation machine. The user interface for controlling the beverage preparation process is thus provided at the external electronic device.

For this purpose, the electronic device may comprise a dedicated computer program respectively an application ("app") for conveniently enabling a control of the beverage preparation machine and which will be further described below.

The multipurpose beverage preparation machine is suitable for preparing a large variety of different beverages such as coffee-, milk- or chocolate-based beverages. Thereby, any liquid components such as milk, water or liquid coffee may be provided to the beverage preparation chamber before or during beverage preparation with the machine. Any solid ingredients or additives such as soluble coffee, chocolate, almond, blackberry, cinnamon, hazelnuts, dry leaves, etc. may be provided into the beverage preparation chamber and/or in the support insert.

For this purpose, the support insert is preferably a bowl- or basket-shaped and designed for holding solids within the beverage preparation chamber during beverage preparation. The support insert preferably comprises perforations or cut-outs in order to enable liquid transfer through the walls of the support insert.

The foaming insert(s) is preferably designed for enabling foaming of a liquid in the beverage preparation chamber.

The multipurpose beverage preparation machine may be designed for supporting a variety of different foaming and/or support inserts.

The foaming insert(s) and the support insert are preferably rotatably supported within the beverage preparation chamber. The foaming insert(s) and the support insert are preferably designed for being individually or commonly coupled in rotation to the motor of the machine. Accordingly, the motor may be configured to drive a single insert or both of the inserts when provided in the beverage preparation chamber.

The multipurpose beverage preparation machine may additionally comprise cooling means for selectively cooling liquid in the beverage preparation chamber. The cooling means may also be controlled in response to beverage process parameters received by the control unit.

The beverage process parameters preferably comprise at least an actuation profile of the motor and/or a temperature profile of the heating means. The actuation profile of the motor preferably comprises values for the rotational speed over time and also preferably the rotational direction of the motor over time. Accordingly, the rotational speed and also preferably the acceleration and/or direction of rotation are defined by these process parameters. The temperature profile preferably comprises values for the particular temperature of the heating means and/or for the actual temperature of the liquid provided in the preparation chamber over time. The beverage process parameters may additionally comprise further parameters such as a temperature profile of cooling means of the machine.

The beverage process parameters preferably further comprise parameters for different phases of the beverage preparation process. For example, the actuation profile and/or the temperature profile preferably comprises at least two individual, preferably a plurality of individual phases, that are carried out in sequence during the beverage preparation process. The actuation profile and/or the temperature profile preferably comprise a duration for one or more phases. Each phase preferably comprises actuation-related values, in particular, a rotational speed value and an acceleration value. Each phase preferably comprises a heating temperature value. Each phase preferably comprises a duration value. The duration value can be attributed to the actuation time and/or the heating time. Predefined preparation pauses may be provided for adding further ingredients or additives, either liquid or solid, into the beverage preparation chamber.

The number of phases and the attributed parameter values may differ depending on the beverage recipe. For example, certain recipes may have only two distinct phases whereas others may have three distinct phases. Certain parameter values and so the corresponding processing means may be disabled for certain phases. For instance, when no heating temperature is attributed as a relevant parameter for a given phase, the heating means is disabled for non-heated beverage recipes.

The control unit is preferably configured to enable the machine to operate the processing means according to predefined beverage recipes from beverage parameters that are pre-stored in the control unit and new beverage recipes from beverage parameters which are transferred to the control unit from the external device. In particular, the parameters corresponding to the new beverage recipes are stored in the memory, e.g., a flash memory, of the control unit. In the both modes, once the recipe is present in the control unit, the machine can be operated autonomously, i.e., without intervention of the external device.

The multipurpose beverage preparation machine may further comprise sensors such as at least one temperature sensor coupled to the beverage preparation chamber and/or a rotational speed sensor coupled to the motor. The temperature sensor is preferably designed to sense the surface temperature of the chamber and thus to indirectly measure the liquid temperature. In an alternative embodiment, the temperature sensor may be designed to directly measure the temperature of the liquid in the chamber. The sensors may provide feedback signals, i.e., sensed parameters, to the control unit for the beverage preparation process. The control unit may be operable to control the heating means to match the beverage process parameters provided by the external electronic device dependent on sensor information from at least one sensor of the beverage preparation machine.

The network interface is preferably a wireless interface. The network interface is designed for data transfer, preferably bi-directional data transfer between the control unit and the external electronic device.

The network interface is preferably generally operable to transmit and receive wireless signals by radio waves. The network interface of the machine is preferably a wireless interface, e.g. a Wireless local area network (WLAN) interface such as Bluetooth or Wi-Fi or a near-field-communication network interface. The network interface may comprise a wired interface, such as at least one selected from a group consisting of: RS-232, USB, I2C, wired local area network interface or another suitable wired interface.

The multipurpose beverage preparation machine preferably comprises a user interface. The user interface preferably comprises at least a start/stop button in order to selectively start or stop a beverage preparation process, and/or an on/off switch. The user interface preferably comprises not more than 1-3 buttons. Accordingly, the complexity of the user interface at the machine is reduced. Further, a very compact machine as home appliance can be provided.

The beverage preparation machine may comprise a display or touch screen unit, for example a dot matrix display, a LCD or OLED display which is preferably integrated in an outer housing of the multipurpose beverage preparation machine. The display unit is preferably not visible if not activated. For example, the display may be embedded in an outer hull structure of the housing of the machine.

In a second aspect, the invention relates to a computer program executable on an electronic device, said program being configured to:
  obtain via a network unit of the electronic device a network connection to a multipurpose beverage preparation machine,
  display a control interface configured for individually selecting a particular beverage to be prepared out of a plurality of beverages,
  determine a plurality of beverage process parameters comprising at least parameters relating to the actuation profile of a motor driving processing means in a beverage preparation chamber of the machine and the temperature profile of heating means of the machine in response to the beverage selection, and
  transmit via the network connection the beverage process parameters to the multipurpose beverage preparation machine upon a user input.

The computer program according to the invention provides a convenient control of the multipurpose beverage preparation machine and in particular of the motor and the heating means thereof in order to obtain a desired beverage result. Thereby, as the complex process parameters for obtaining a desired beverage are determined and provided to the machine by the computer program, the user will not have to bother with complex setting of parameters at a dedicated user interface while being still able to provide a large variety of different beverages. Further, the costs and necessary space at the machine for a complex user interface may be omitted. In addition, the program is preferably executable on a generally available handheld electronic device such as a smartphone or tablet. Hence, a user of the machine does not have to additionally buy expensive hardware for controlling the machine.

The process parameters are preferably determined by determination means of the computer program that is preferably a program logic. The determination of the process parameters may comprise the step of retrieving the process parameters from a memory unit on which the process parameters for the particular beverage selection are stored. The memory unit may be a memory unit of the electronic device or of an external source such as a remote resource or database to which the electronic device may be connected.

In a mode, the computer program is configured to fully transmit all the process parameters related to a recipe or group of recipes before the beverage preparation process. The full transmission (i.e., downloading) of the process parameters lead to an autonomous control of motor and the heating means by the control unit of the machine irrespective of the status of connection of the electronic device with the machine. The machine can thereby be utilized in non-connected mode.

In another mode, the computer program can be configured to intermittently transmit at least part of the process parameters to the machine during a beverage preparation process, dependent on a display of individual beverage preparation steps and/or a user input via the control interface. The intermittent transmission of process parameters preferably leads to a step-wise control of the motor and the heating means of the machine during distinct beverage preparation steps or phases.

In every mode, the computer program is preferably designed to enable the preparation of multi-phase beverages with individual preparation steps that are carried out in sequence.

In a preferred embodiment, the computer program is configured to create new beverage preparation recipes for a beverage preparation process with the machine. The new beverage recipes may be saved to and selectively retrieved from a beverage library stored in a memory unit of the electronic device, the beverage preparation machine or a remote resource.

In a preferred embodiment, the determination means of the computer program are configured for determining the respective process parameters based on a basic selection of a user via the control interface. Accordingly, the user of the computer program may conveniently create and store a multitude of customized beverage preparation recipes via the computer program. Thereby, no laborious setting of complex process parameters such as rotational speed, acceleration, temperature, etc. is required by the user. Instead, the complex process parameters (or particular combinations of process parameters) are coupled to meaningful terms of different available selections to the user of the program, which may be conveniently selected in order to obtain the desired result.

The basic selection preferably comprises the selection of any one or a combination of: a beverage type, a texture type, and an ingredients or additives type for a resulting beverage. The basic selection may be limited to the above options. The basic selection may additionally comprise further options such as information as to a particular type of insert, such as a foaming insert or a support insert, to be inserted in the chamber of the machine.

The basic selection "beverage type" may comprise the selection of "coffee-based", "milk-based" and "chocolate-based" and may further comprises different subgroups for the respective beverages such as "Espresso" or "Cappuccino Barista" for "coffee-based", "Latte macchiato" or "Flat white" for "milk based" and "Hot chocolate" for "chocolate-based".

The basic selection "texture type" may comprise "liquid", "dense" and "texture", whereby the latter two may relate to a beverage comprising an at least partial foamy structure and the first relates to a purely liquid beverage without any foam. The selection "texture type" preferably comprises a selection that leads to at least two, preferably at least three different foam structures of the resulting beverage. The different foam structures preferably relate to different aeration level of the resulting foam.

The basic selection "ingredients" or "additives" type may relate to beverage ingredients such as soluble coffee, chocolate, almond, blackberry, cinnamon, hazelnuts, ice cubes, etc.

Based on this basic selection by the user of the computer program, the determination means will determine the required process parameters relating at least to an actuation profile of a motor of the machine and a temperature profile of heating means of the machine for obtaining the desired beverage. The process parameters may further comprise a phasing parameter, i.e. whether one or more preparation phases are to be carried out in order to obtain the desired beverage.

The determination of the process parameters preferably comprises the step of retrieving the process parameters from a memory unit, e.g. from a database, to which the particular process parameters for a specific beverage selection are stored. Thereby, the determination means are preferably configured to take into account all information provided by the basic selection of the consumer. For example, in case the user has selected a very foamy milk beverage, the determination means will provide for a very fast acceleration and high rotational speed of the motor and thus of the foaming insert of the machine in order to obtain the desired result. In case of a selection of further beverage additives that may affect the beverage preparation process, the determination means will suitably adapt the process parameters in order to still obtain an optimal beverage result which is in line with the selection of the user.

The basic selection is preferably organized as a sequential navigation through graphical menus and submenus comprising the lists of selectable types (e.g., beverage, texture, ingredient, insert, additive, etc.). In an alternative, the basic selection can be displayed through videos.

The computer program may further be configured to obtain sensed parameters such as sensor data of the multi-purpose beverage preparation machine and to control the heating means and/or the motor actuation accordingly to match the beverage process parameters dependent on this information. For example, a temperature sensor which directly or indirectly senses the temperature of the liquid can be provided to provide temperature input of the liquid in the chamber before and/or during the preparation. Such temperature sensing enables to more accurately control the actuation of the heating means more finely and reactively.

The computer program may be configured to automatically obtain a network connection between the electronic device and the network interface of the machine. Said connection may comprise using a known protocol for data transfer, e.g. TCP or DHP. The computer program may as well be configured for selectively obtaining a network connection between the electronic device and the network interface of the machine, i.e. upon a dedicated user request such as the pressing of a dedicated "connect" button in the displayed control interface.

The computer program may be configured to automatically or upon user request obtain a network connection between the electronic device and a remote resource such as an external server or cloud server. Said connection may comprise using a known protocol for data transfer, e.g. TCP or DHP and may be established over a cellular network (e.g. UMTS, LTE, etc.) and/or the internet.

The computer program may be configured to upload and/or download information regarding the machine and/or the process parameters for controlling the machine to or from such external server. The remote resource may be a server system (e.g. embodied as hardware and/or software), a peer-to-peer network or other distributed system. The remote resource is preferably arranged at a different location to the electronic device and the beverage preparation machine.

In a preferred embodiment, the computer program is configured to selectively and/or automatically retrieve beverage preparation recipes from the remote resource. The beverage preparation recipes contain beverage process parameters and preferably at least the parameters concerning the actuation profile of the motor and the temperature profile of the heating means of the machine. The beverage preparation recipes from the remote resource may be stored automatically or upon user selection to a beverage library in a storage unit of the electronic device or of the machine. The beverage preparation recipes may be created by a service provider and uploaded onto the remote resource for download by consumers. The beverage preparation recipes may be adapted/updated periodically. Accordingly, a large variety of different beverage creations or recipes, which comprise predefined and/or adaptable values for the respective beverage process parameters, may be provided by the remote resource. The beverage recipes may either be offered for download or may be downloaded automatically by the computer program. Accordingly, a consumer is enabled to access a very large library of different beverage creations and may for example selectively download beverage creations for his/her specific taste preferences.

It is also possible that new beverage creations or recipes may automatically be distributed by the remote resource to the computer program respectively the electronic device when connected thereto. This is for example advantageous when new beverage preparation ingredients are released on the market. The new beverage recipes may then be specifically adapted to the beverage ingredients.

In a preferred embodiment, the computer program is configured for adapting the beverage preparation recipes stored on the electronic device and/or on the machine. Thereby, the computer program is in particular configured for enabling a user to customize the basic selection parameters as previously described. For example, the user of the computer program may edit a beverage preparation recipe and may add further additives or customize the foam level of the resulting beverage by the basic selection. Accordingly, a convenient customization of the resulting beverage is provided without having to cumbersomely adapt complex process parameters of the machine.

The computer program is preferably configured to selectively upload individual beverage preparation recipes stored e.g. on a memory unit of the electronic device to the remote resource. Accordingly, individual creations of the consumer may be uploaded to and stored at the remote resource and may be made available for download by other consumers. Accordingly, a consumer may share his/her favorite beverage creations via the computer program and the remote resource.

The computer program is preferably configured for selectively assigning a rating characteristic to a particular beverage preparation recipe. The rating characteristic may be assigned to beverage recipes stored in the memory unit of the electronic device and/or may be assigned to beverage recipes available on a public beverage library provided by the remote resource. Thereby, the computer program may be configured for uploading the rating characteristic of a respective beverage preparation recipe to the remote resource. Accordingly, a public rating and feedback system may be provided for beverage preparation recipes available on a public beverage library. The public rating may be based on the sum of individual uploaded ratings of the consumers.

The computer program is preferably configured to automatically and/or selectively adapt a user interface or display unit of the machine. For example, the computer program may be configured to provide a beverage recipe with an assigned beverage name from the electronic device and/or a remote resource to the beverage machine. The beverage recipe is preferably saved within an internal memory thereof and may be retrieved and carried out conveniently be pressing a selection and/or start button of the machine or by pressing the assigned beverage name on a touch screen of the machine. Accordingly, a user may then also use a non-complex user interface of the machine to select a desired beverage. The remote control of the machine is possible from the electronic device. However, when the process parameters and recipe names are downloaded to the machine by the electronic device, the machine is configured to carry out the beverage preparation autonomously when the user selects the desired recipe on the display (e.g., touch screen or button).

The computer program is preferably configured to provide preparation instructions in successive steps in which the steps are graphically displayed by chronological order as a function of the progress of preparation of the recipe; with at least one step requiring the remote user input for starting the beverage preparation machine according to the transmitted beverage process parameters. As a result, the preparation of the beverage via a graphical interface of the electronic device is facilitated and enables the control of when the machine is started off. The preparation instructions could also be displayed through videos.

The computer program described above may be implemented, in various manners, using digital electronic logic, for example, one or more ASICs or FPGAs, one or more units of firmware configured with stored code, one or more computer programs or other software elements such as modules or algorithms, or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

In a further aspect, the invention relates to a non-transient computer readable medium comprising the computer program according to the second aspect of the invention. The non-transitory computer readable medium may comprise a memory unit associated with a processor of the electronic device or other computer-readable storage media for having computer readable program code stored thereon for programming a computer, e.g. a hard disk, a CD-ROM, an optical storage device, a magnetic storage device, Flash memory, or a storage device of a server for download of said program.

In a further aspect, the invention relates to an electronic device comprising the computer program as described above. The electronic device can be any electronic device with at least one network interface for communicating with a multipurpose beverage preparation machine.

For example, the electronic device may comprise (or can be included in) at least one selected from a group consisting of a desktop computer, a laptop computer, a server, a media player (such as an MP3 player), a subnotebook/netbook, a tablet computer, a smartphone, a cellular telephone, a set-top box, a personal digital assistant (PDA), a game console, and/or another electronic device. In a preferred embodiment, the electronic device is a portable small form factor device respectively a handheld device such as a smartphone, a PDA or a tablet computer.

The electronic device preferably comprises a processing unit, a memory unit, a network unit, a display unit and/or an input/output (I/O) system. The input/output system may be comprised by the display unit such as e.g. in the form of a touchscreen.

The electronic device for being connected to the multipurpose beverage preparation machine is thus designed for providing a convenient user interface by means of which a plurality of individualized beverages may be prepared with the multipurpose beverage preparation machine.

The electronic device is preferably configured for being selectively connected with a machine by means of its network interface. The electronic device may be configured for selectively being associated with more than one machine, whereby the beverage process parameters for controlling the respective machine may be adapted, stored and managed individually for each machine. The electronic device and the beverage process parameters stored thereon may thus be used for beverage preparation at various machines that are equipped with a dedicated network interface. A user may thus define his preferred beverage process parameters in a beverage preparation recipe and may use the particular recipe for beverage preparation at any machine suitable for interacting with the electronic device.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

FIGS. 8a-8c relate to screenshots of a preferred embodiment of a control interface of the computer program respectively the electronic device according to the invention.

DETAILED DESCRIPTION OF THE FIGURES

Figure 1:
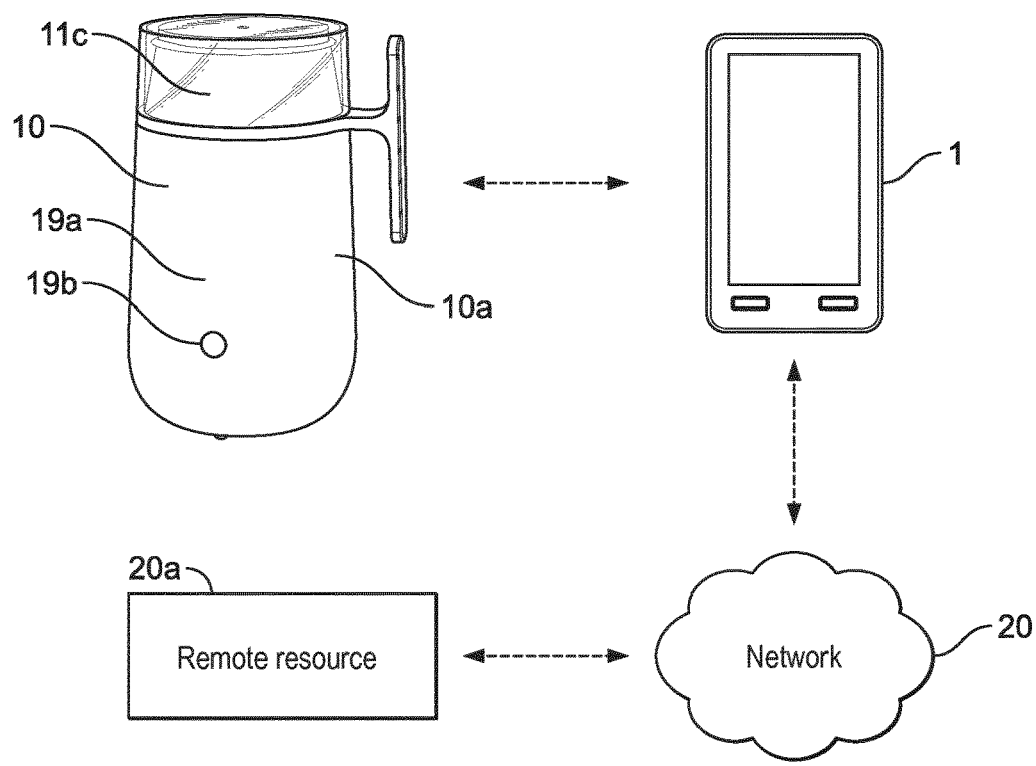
FIG. 1 is a schematic illustration of a multipurpose beverage preparation machine coupled to an electronic device according to the present invention.

FIG. 1 relates to a schematic illustration of a system according to the present invention, the system comprising a multipurpose beverage preparation machine 10 and an electronic device 1. The electronic device 1 and the machine 10 are preferably designed for communicating via wireless signals. For this purpose, the beverage preparation machine 10 and the electronic device 1 preferably each comprise a dedicated network interface 3, 18 (see FIGS. 4 and 6). The connection can be, for example, Bluetooth.

The electronic device 1 may be configured for communicating with a remote resource 20a via a network 20 (or "Cloud"). The communication between the electronic device 1 and the remote resource 20a may be via a wireless network such as a cellular network (e.g. UMTS, LTE, etc.) or a WLAN connection. Preferably, the connection is configured to be possible at least by Wi-Fi.

The multipurpose beverage preparation machine 10 may as well be configured for communicating with a remote resource 20a, indirectly, i.e. via the electronic device 1, and optionally directly, i.e. by means of a wired or wireless connection of the network unit 18 of the machine 10 with the remote resource 20a. It should be noted that the machine 10 could also be directly connected to the network 20 such as by Wi-Fi for enabling direct communication from the Cloud to the machine such for updating firmware.

The beverage preparation machine 10 is preferably a mixing and/or frothing machine such as a multipurpose milk frother. The machine 10 preferably comprises a housing 10a to which a lid 11c may be attached. The machine preferably comprises a user interface 19. The user interface 19 may comprise a start/stop button 19b. The user interface may comprise a display unit 19a such as a dot matrix, a LCD or OLED display. The display may be arranged at a front side of the housing 10a and may be fully embedded in the housing.

Figure 2:
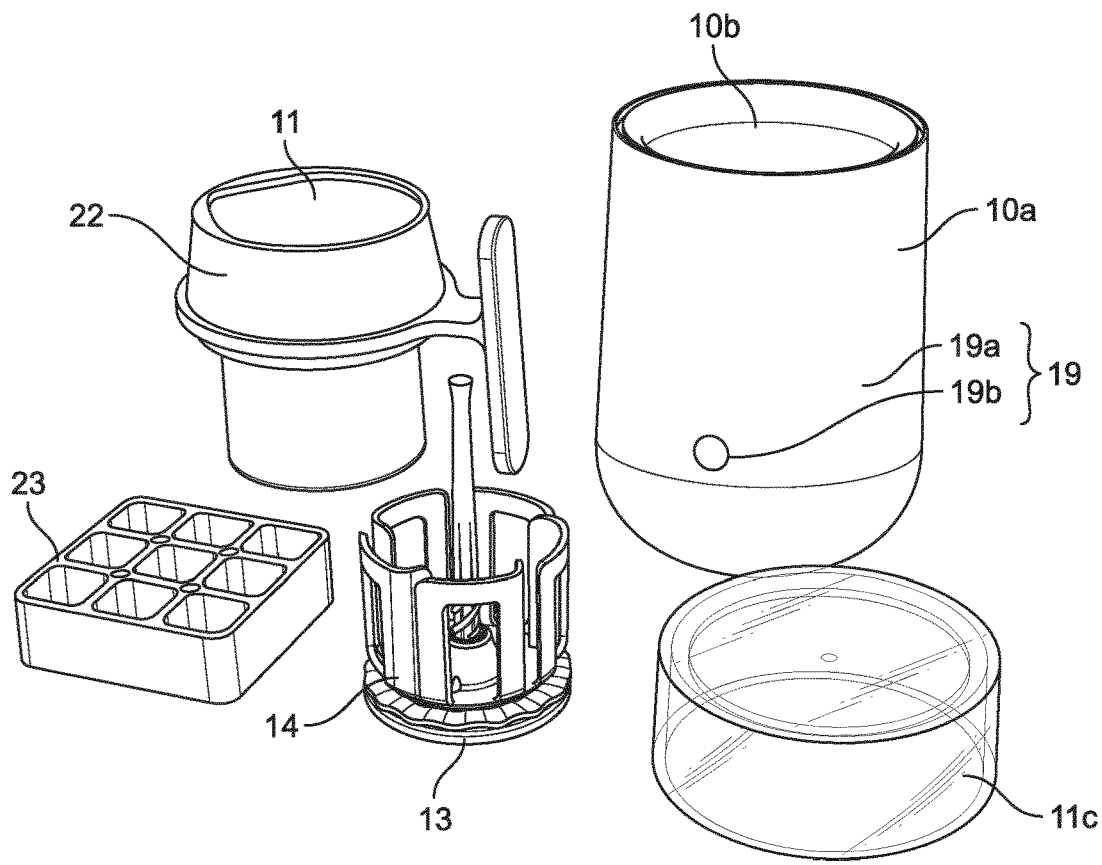
FIG. 2 is a perspective view on the individual parts of a preferred embodiment of the multipurpose beverage preparation machine.
Figure 3:
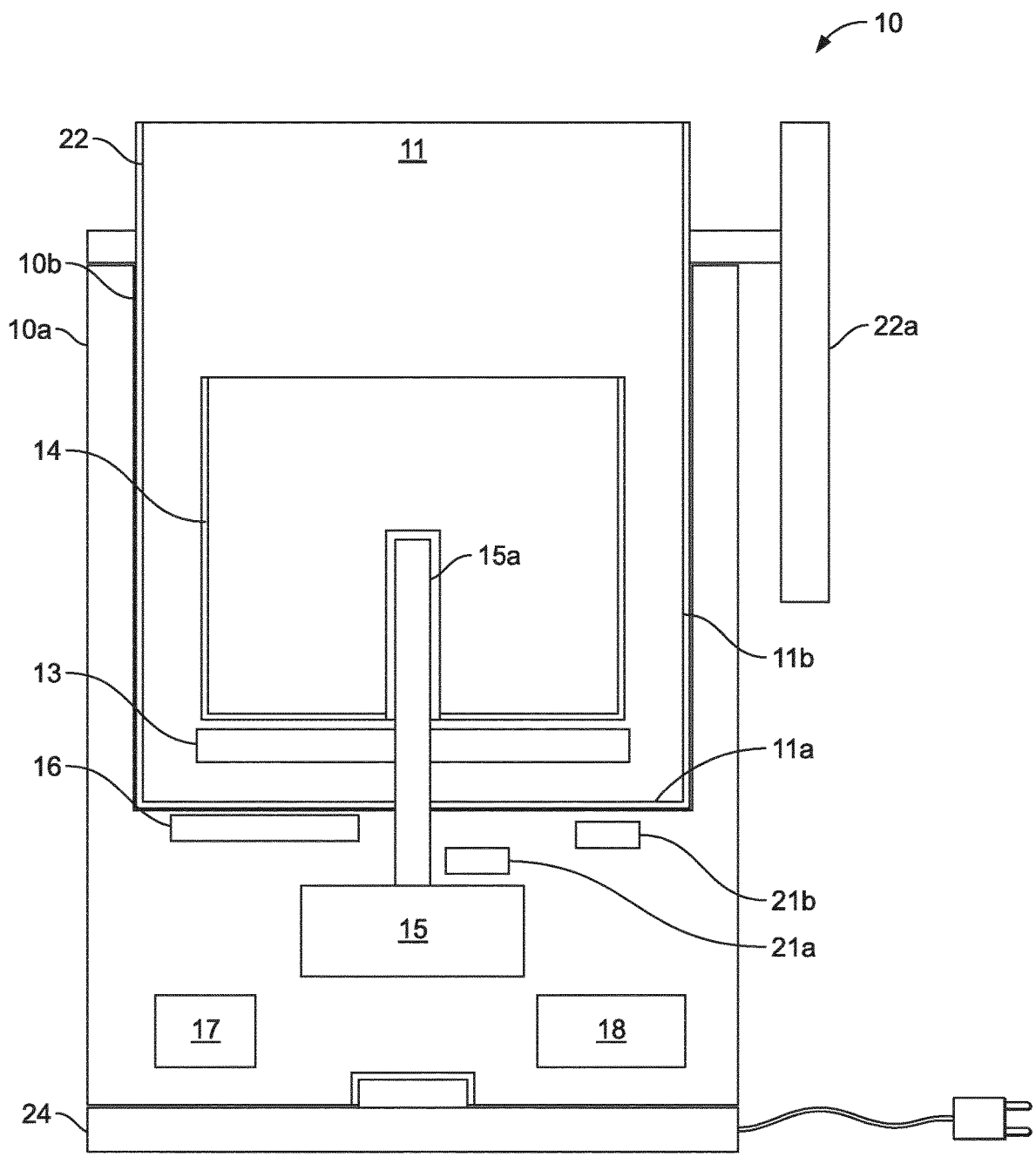
FIG. 3 is a sectional side view of the multipurpose beverage preparation machine according to FIG. 2.
Figure 4:
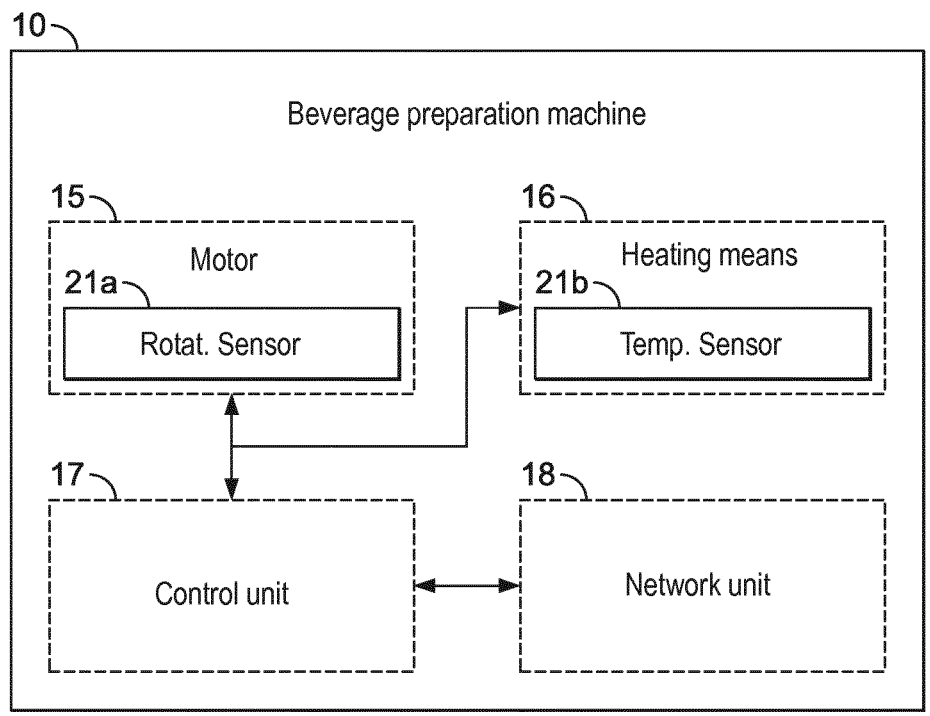
FIG. 4 is a block diagram of the components of the multipurpose beverage preparation machine according to the invention.

As shown in FIGS. 2 to 4, the multipurpose beverage preparation machine 10 comprises a beverage preparation chamber 11 for receiving a liquid. The beverage preparation chamber 11 may be directly provided in the housing 10a (not shown) or may be provided in a removable cup insert 22 that is selectively attachable to the housing 10a such as shown in the figures. For this purpose, the housing 10a may comprise a receiving aperture 10b for receiving and supporting the cup insert 22. A handle 22a of the cup insert 22 facilitates handling thereof. The beverage preparation chamber 11 is preferably formed by a base wall 11a and a sidewall 11b of the cup insert 22. The selectively attachable lid 11c is designed for closing-off the beverage preparation chamber 11 during beverage preparation.

The machine 10 further comprises processing means for processing the beverage from liquid and optionally solid ingredients filled in the preparation chamber. In particular, it comprises a foaming insert 13 and a support insert 14 arranged for being selectively positioned within the beverage preparation chamber 11. The foaming insert 13 is preferably a rotatable whisk or stirrer suitable for creation of foam on the liquid when being rotated within the beverage preparation chamber 11. The support insert 14 is preferably an ingredients support basket suitable for holding solid ingredients therein. The solid ingredients may be dissolvable, infusible, dispersible or meltable in the liquid, e.g., milk, such as chocolate pieces, ice cubes, spices (e.g. cinnamon) and sweetener.

The foaming insert 13 and/or the support insert 14 may be selectively driven in rotation by a motor 15 of the machine 10. For this purpose, the inserts 13, 14 may be coupled with a rotating shaft 15a of the motor 15 as shown in FIG. 3. The foaming insert 13 and the support insert 14 are lockable to and separable from the rotating shaft 15a. Each of them can be inserted or removed from the chamber 11 either individually or together. The foaming insert 13 is preferably arranged in vicinity of a bottom portion 11a of the beverage preparation chamber. The support insert 14 is preferably arranged above the foaming insert 13. The support insert may take the form of a basket or bowl with apertures enabling liquid to traverse the insert during actuation.

The multipurpose beverage preparation machine preferably further comprises heating means 16 configured for heating a liquid in the beverage preparation chamber 11. The heating means 16 may be positioned under the bottom portion 11a of the beverage preparation chamber 11. The heating means 16 can also be embedded in the bottom wall or positioned in a part of a sidewall 11b of the chamber 11.

The machine 10 may further comprise a temperature sensor 21b configured for measuring the temperature of a liquid contained in the chamber 11. The temperature sensor provides feedback information as to the temperature of the liquid during heating by the heating means. The heating means are then controlled accordingly. The temperature sensor may also provide an indication of the temperature of the liquid when filled in the chamber. Such indication may be displayed on the display of the machine and/or electronic device. A rotational sensor 21a may be coupled to the motor 15 in order to provide feedback information regarding the rotational speed of the motor 15.

The machine 10 further comprises a control unit 17 that is operable to execute a beverage preparation process comprising control of the motor 15 and/or the heating means 16. The control unit 17 is coupled to a network unit 18 of the machine 10 comprising a network interface that is designed to receive beverage process parameters from the external electronic device 1. The control unit 17 is preferably further coupled to temperature and rotational sensors 21a, 21b for receiving feedback information.

The control unit 17 of the beverage preparation machine may comprise safety functions such as a monitoring of the rotation of the rotating shaft 15a. The monitoring may be based on the determination of the power variation of the motor. When the power increases to a given level, the power supplied to the motor is shut off to avoid risks of failure of the motor.

The machine 10 may comprise a docking station 24 from which the upper part of the machine 10 comprising the beverage preparation chamber 11 is selectively disconnectable. The docking station 24 preferably comprises electric power supply means such as a connector for connection to the mains or to a battery.

The machine 10 may further comprise a cooling unit (not shown) for selectively cooling the liquid held within the beverage preparation chamber 11. Alternatively, ice cubes in the support insert or provided e.g. by an optional ice cube tray 23, may be provided into the beverage preparation chamber 11 in order to prepare a cooled beverage.

The network unit 18 of the machine is preferably designed for communicating wirelessly with the external electronic device 1 and/or a remote resource 20a. The network unit 18 preferably comprises a wireless interface such as Bluetooth, Wireless local area network (WLAN) or a near-field-communication network interface. The network unit 18 may be designed for establishing a dedicated network connection via a cellular network.

Figure 5:
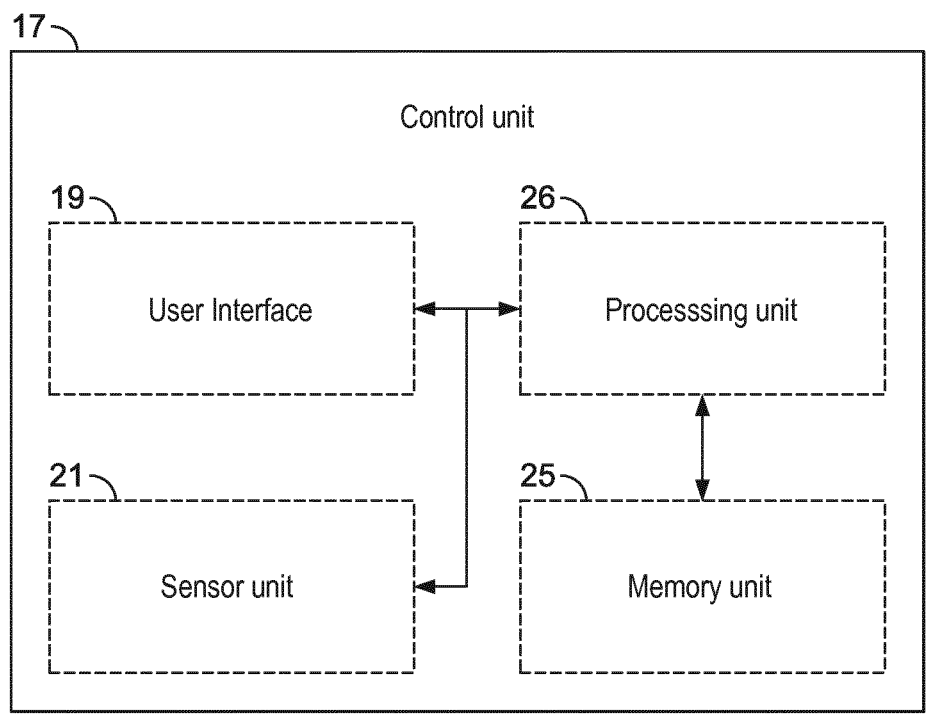
FIG. 5 is a block diagram illustrating a preferred embodiment of a control unit of the multipurpose beverage preparation machine.

As shown in FIG. 5, the control unit 17 of the multipurpose beverage preparation machine 10 preferably comprises a user interface 19, a processing unit 26, a sensor unit 21 and/or a memory unit 25. The user interface 19 preferably comprises a start/stop button 19b arranged at a housing 10a of the machine 10. The user interface 19 may comprise a display or touch screen 19a.

A processing unit 26 of the control unit 17 is designed for operating the control unit, retrieving process parameters, e.g. from the electronic device 1 and/or a remote resource 20a connected to the machine 10, processing the obtained parameters and effecting a corresponding control of the machine 10.

A memory unit 25 of the control unit 17 is preferably connected at least to the processing unit 26. The memory unit 25 is configured for storing process parameters 9 of the machine 10.

The control unit 17 may further comprise a sensor unit 21 which is connected to the dedicated sensors 21a, 21b of the beverage preparation machine 10 and which are designed for providing information in particular regarding the actual temperature of the liquid in the beverage preparation chamber 11 and the rotational speed of the motor 15.

Figure 6:
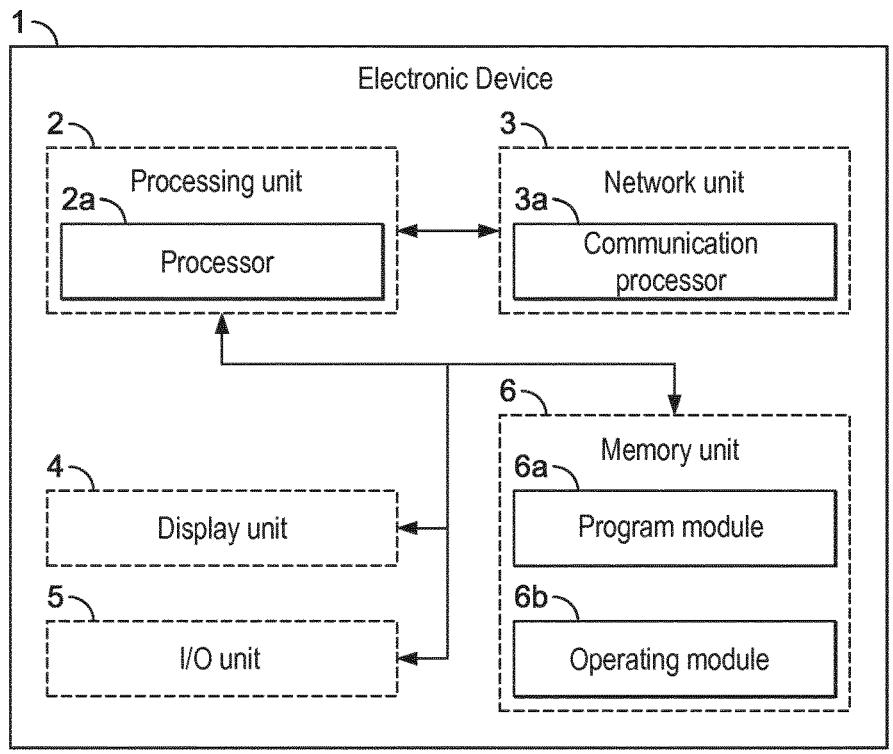
FIG. 6 is a block diagram illustrating a preferred embodiment of the electronic device according to the invention.

FIG. 6 relates to a schematic illustration of an electronic device 1 according to a preferred embodiment of the present invention. The electronic device 1 preferably comprises a processing unit 2 having a processor 2a and which is designed for carrying out coded instructions such as a computer program according to the invention.

The device 1 further comprises a network unit 3 that preferably comprises a communication processor 3a. The network unit 3 is preferably designed for connecting to the beverage preparation machine 10.

The device 1 further comprises a memory unit 6. The memory unit 6 may comprise a program module 6a and an operating module 6b. The program module 6a and/or the operating module 6b may be designed for storing data and/or instructions for the processing unit 2 and the network unit 3. The memory unit 6 may comprise a dynamic random access memory (DRAM), static random access memory (SRAM) and/or other types of memory. The instructions comprise one or more computer programs that are executable by the processing unit 2 as a control interface program. The computer program may be composed of one or more program modules 6a. The program modules can be implemented in any suitable manner e.g. as a high-level procedural language, an object orientated language, an assembly or machine language. Moreover, said language may be complied or interpreted to be executed by the processing unit 2.

The device 1 preferably comprises a display unit 4 and/or an input/output unit 5. The display unit 4 and the input/output unit may be formed by the same entity such as for example a touch screen. The input/output unit 5 is preferably designed to enable the displaying of a user control interface 30 for operating the beverage preparation machine. Further, the input/output unit 5 is preferably adapted to enable a user input. For this purpose, the input unit may comprise buttons, touch sensing or screen edge buttons associated with the display or buttons associated with LEDs. Any user commands are transferred from the input unit 5 to the processing unit 2 as a signal. The device 1 is thus designed for enabling a user to select a specific beverage to be prepared by the machine 10 and to initiate a beverage preparation process. An example for such user control interface 30 is further discussed with reference to FIG. 8-10 below.

Figure 7:
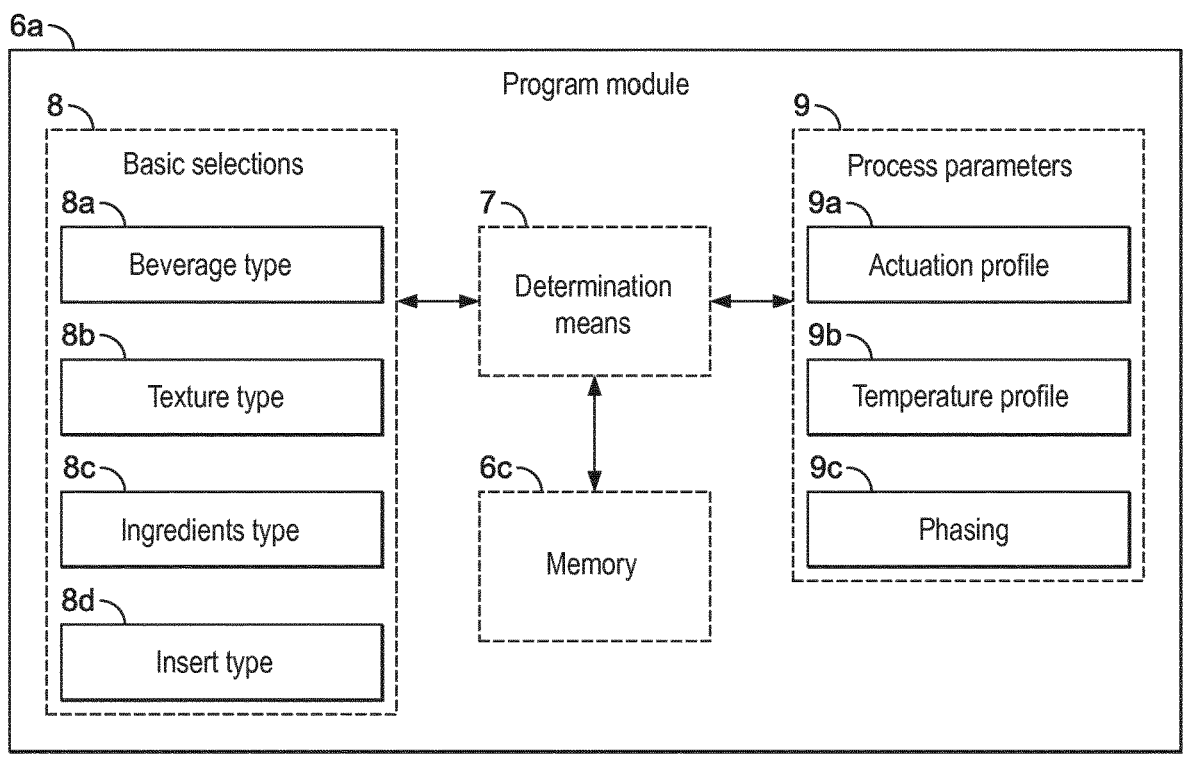
FIG. 7 is block diagram illustrating a preferred embodiment of a program module according to the invention.

FIG. 7 relates to a schematic illustration of the program components of a program module 6a of a computer program according to the invention. The program comprises determination means 7 such as a program logic that is configured to determine the respective process parameters 9 for a beverage preparation process with the multipurpose beverage preparation machine 10 based on a basic selection 8 of a user, e.g. via a control interface 30 of the computer program.

The beverage process parameters 9 for the respective beverages comprise at least an actuation profile 9a of the motor 15 and a temperature profile 9b of the heating means. The beverage process parameters 9 preferably further comprise information about the different phases 9c to be carried out in sequence with the multipurpose beverage preparation machine in order to obtain the desired beverage.

The basic selections 8 preferably comprise the selection of a beverage type 8a, a texture type 8b, and/or an ingredients or additives type 8c for a resulting beverage. The basic selection may be limited to the above options. The basic selection may however additionally comprise further options such as information as to a particular type of insert 8d, e.g. the foaming insert 13 and/or the support insert 14, to be inserted in the chamber of the machine 10.

The determination of the process parameters 9 preferably comprises the step of retrieving the process parameters from a memory unit 6c, e.g. from a database, to which the particular process parameters 9 for a specific beverage selection are stored. Thereby, the determination means 7 are configured to take into account all of the basic selections 8 provided by the consumer. The respective process parameters 9 may be stored in dedicated tables in a database in memory unit 6c. The memory unit 6c may be the memory unit 6 of the electronic device. Alternatively or in addition, the determination means 7 may be configured to communicate with an external memory unit such as the memory unit 25 of the machine 10 or an external database such as e.g. provided at the remote resource 20a.

The determination means 7 may further be configured to obtain information such as sensor data of the multipurpose beverage preparation machine 10 and to adjust the beverage process parameters 9 dependent on this information.

Table 1 relates to examples for different beverages to be prepared by the multipurpose beverage preparation machine and to exemplary values for different beverage process parameters 9 of the respective beverage.

The different beverage recipes to be prepared with the multipurpose beverage preparation machine may comprise beverages such as "Chantilly" foamed milk or "Cold microfoam" milk, which essentially differ in the type of the obtained milk foam as will be described later. "Latte macchiato", "Cappuccino" or "Flat white" are examples for composite beverages from milk and coffee. Thereby, the milk component may be prepared with the machine 10, while the coffee component may be prepared by means of a separately connected coffee machine such as a machine using coffee capsules (not shown). The two components may then be mixed together in a receiving receptacle such as a glass or a mug. The coffee component may however be as well directly provided into the machine 10. This is for example the case for a "Mocha" beverage as indicated in the table.

The actuation profile 9a of the motor preferably comprises values for the rotational direction, rotational speed and acceleration ("RPM" and "RPM/s") of the motor over time ("Duration"). The temperature profile 9b preferably comprises values for the temperature ("Heating T") over time ("Duration"). The beverage process parameters preferably comprise different phases "Phase 1", "Phase 2", "Phase 3" of the beverage preparation process and in which the actuation profile 9a and the temperature profile 9b may vary. The information regarding the different phases may as well contain information as to whether the respective phase of the beverage preparation process it to be carried out inside or outside of the beverage preparation chamber 11.

The process parameters 9 may further comprise information as to what type of ingredients are required, such as "milk", "coffee", "chocolate", "ice cube", "crushed ice", "liquid sugar", "syrup", "spicer", etc., the amount of ingredients required, such as a particular volume of liquid or a predefined amount in pieces, e.g. for chocolate. The process parameters 9 may further comprise information as to what type of insert, i.e. foaming insert 13 ("wavy cut out whisk") or the support insert 14 ("Basket") or both is to be provided to the machine 10 for the specific beverage preparation process.

FIGS. 8a to 8c relate to an exemplary embodiment of a control interface 30 provided by the computer program executable on an electronic device 1 according to the invention. The control interface 30 is preferably displayed on a touch screen of the electronic device 1. The computer program is preferably an application ("app") stored and executable on a handheld device such as a mobile phone or tablet computer.

The control interface 30 is designed for enabling a beverage selection either from a recipe list stored on the electronic device 1 or from a recipe list provided on a remote resource 20a to which the electronic device 1 may be connected. The selection may be enabled via dedicated buttons of the touch screen of the electronic device 1. For this purpose, a home screen as depicted in FIG. 8a preferably comprises a selection 31, 32 whether the user would like to access a recipe list or library stored on the electronic device 1 and/or on the beverage preparation machine 10 ("Library", 31) or whether the user would like to access a recipe list or library provided by a remote resource 20a ("Discover", 32). The home screen may as well comprise an indication 33 of the amount of recipes stored on the electronic device 1 and/or on the beverage preparation machine 10. A further selection button 33a may be indicated for editing the available recipes.

FIG. 8b relates to the control interface 30 depicting a submenu screen relating to the recipe library (selection 31 in FIG. 8a) and which displays the beverage recipes 34 stored on the electronic device 1 and/or the machine 10. Each beverage recipe, e.g. icons and/or photos, can be individually selected by touch. The depicted screen may list beverage recipes 34 as created by the user with the computer program or as downloaded from a remote resource 20a in a dedicated area 34a of the screen, or remixed recipes 34b, i.e. recipes which were downloaded and which were adapted by the user via the computer program.

The computer program may be configured for assigning a rating characteristic 35 to the respective beverage recipes 34a, 34b. The rating characteristic 35 may either be a personal rating by the user, who may assign an incremental rating value to each of the provided recipe or who may indicate particular preferred recipes in the form of a marker such as a heart or star(s). The rating characteristic 35 may as well be based on an overall rating retrieved from a remote resource 20a on which the user may upload a particular beverage recipe that may then be shared and rated by different users. The rating characteristic 35 may thus comprise a number relating to users that have already rated and liked the particular beverage recipe.

FIG. 8c relates to the control interface 30 depicting a submenu screen relating to a public library (selection 32 in FIG. 8a) and which shows the beverage recipes provided by a remote resource 20a, e.g. by a database stored thereon. The beverage recipes may be depicted in a simple list or may be presented in different subgroups for user selection. For example, the public library may comprise a subgroup relating to trend beverages 36a, to beverages with very good user rating 36b or to newly created beverage recipes 36c. The public library preferably comprises an indication 36d about the rating of the respective beverage recipes. A user may thus explore the public library and may selectively download a recipe to the electronic device 1 and/or to the machine 10.

Figure 9G:
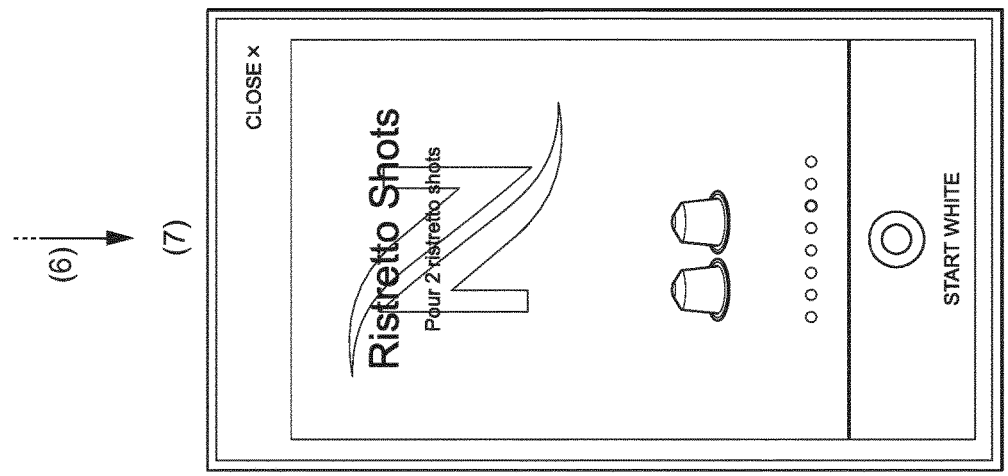
FIG. 9 relates to a series of screenshots of the control interface when preparing a beverage with the multipurpose beverage preparation machine.

FIG. 9 relates to a beverage preparation process by means of the computer program according to the invention. Thereby, a user may select a beverage recipe such as e.g. "Flat white" stored on the electronic device 1 or on the public library and may initiate a beverage preparation process, e.g. by pressing on a dedicated selecting button 37 of the control interface 30. Thereby, the computer program may be configured to execute a beverage preparation program of a recipe provided by the public library 31. The process parameters for the selected recipe are preferably downloaded in the electronic device before execution and stored in its memory unit.

As indicated in the screenshots of the computer program in FIG. 9, the computer program is designed to guide a user through the beverage preparation process with the machine 10 in case the electronic device 1 is connected to the machine 10. This may be obtained via graphical images 38a. Thereby, the computer program may give instructions which parts of the multipurpose beverage preparation machine 10 are to be provided in the beverage receiving chamber 11, i.e. the foaming insert 13 ("Milk whisk") and/or the support insert 14, and which ingredients such as milk, coffee, chocolate, cinnamon, hazelnuts, almond, etc. are to be added in which preparation phase to the beverage preparation chamber 11. Further, a remote activation of the machine 10 may take place via the electronic device 1 at dedicated beverage preparation steps.

For example, after selection of a beverage recipe such as "Flat white" in step 1, the computer program may provide preparation instructions in the following steps 2-7. Thereby, a user may push a dedicated button or swipe a displayed graphical image 38a on the display of the electronic device after having completed the indicated beverage preparation step. An indicator 38b may be displayed which indicates the sequence of necessary preparation steps. A dedicated start button 38c may as well be displayed. The start button 38c may only be active in specific preparation steps, such as in step 6 in which the user is informed that activation of the machine 10 should be initiated. An activation of the machine 10 may as well take place automatically in case the user proceeds from the previous step 5 to step 6, e.g. by pushing a dedicated button or swipe the displayed graphical image.

The process parameters 9 for the respective beverage recipe and as determined by the computer program may either be initially transmitted to the machine 10 upon selection of the beverage in step 1, or upon activation of the machine in step 6.

Figures 10A, 10B, 10C:
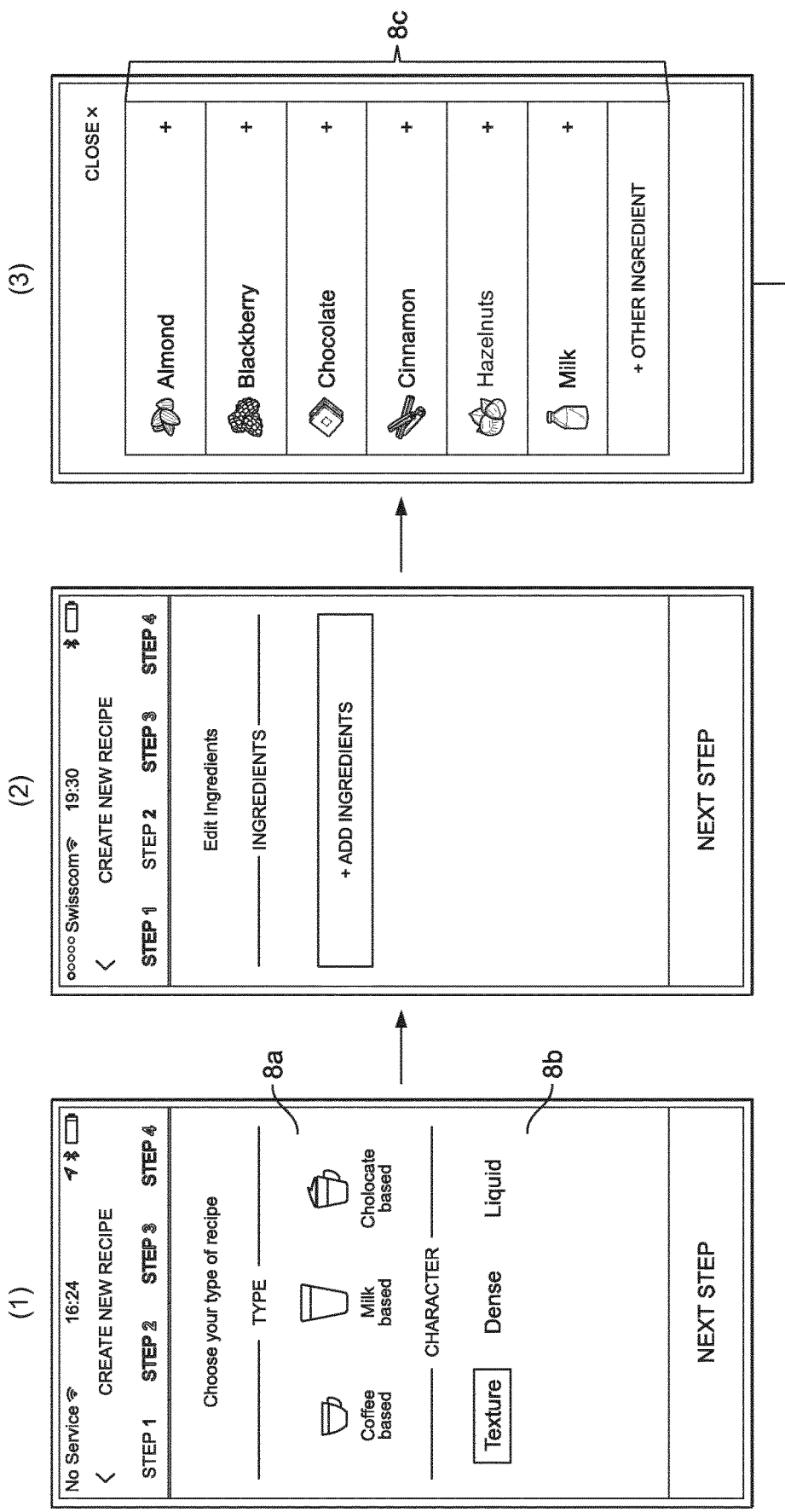
FIG. 10 relates to a series of screenshots of the control interface when creating a new beverage preparation recipe.
Figures 10D, 10E, 10F:
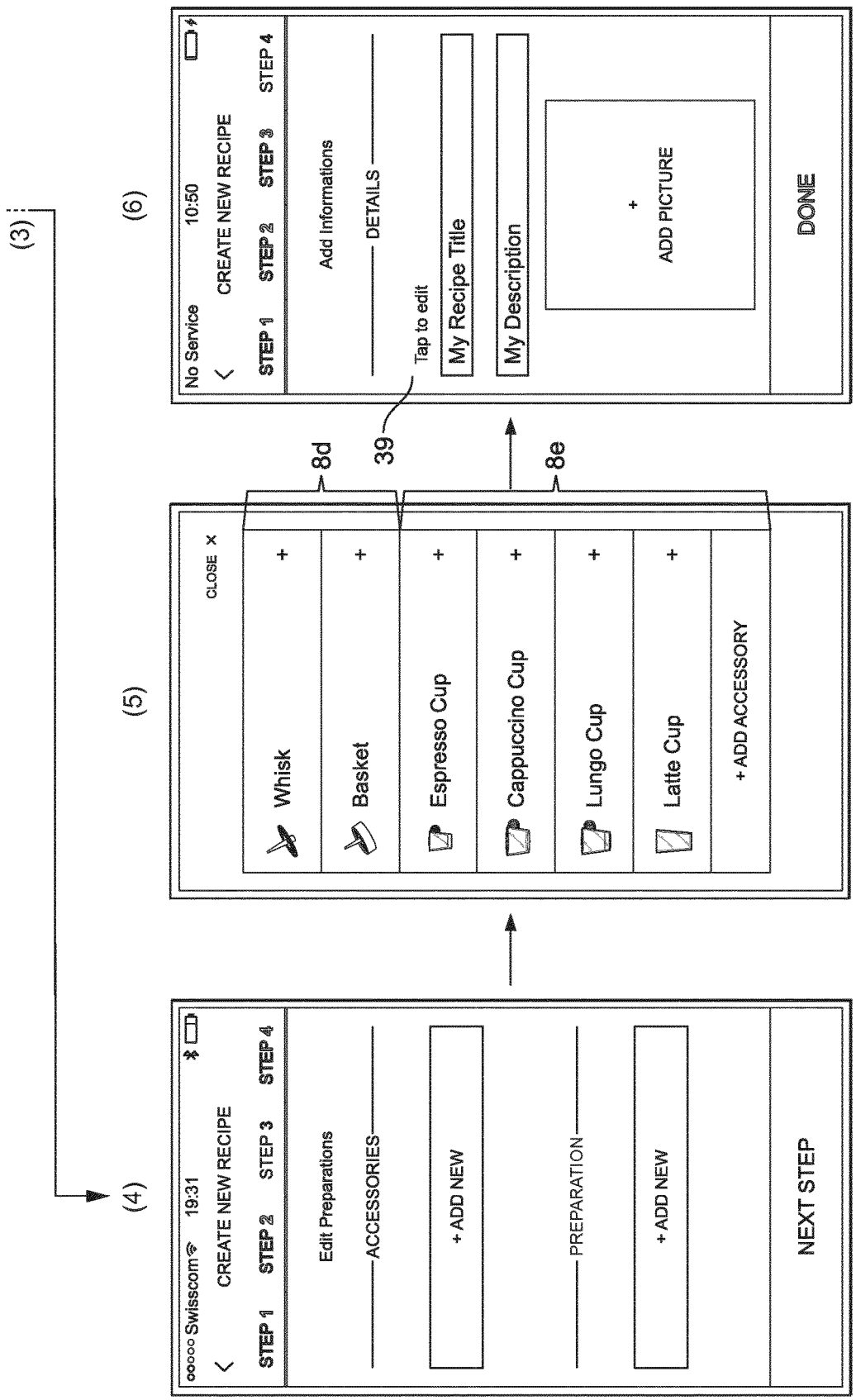

FIG. 10 relates to a process of creating a beverage recipe 34 by means of the computer program according to the invention. Thereby, the computer program is configured to display a variety of basic selections 8 which may be selected in order to create an individualized beverage recipe and which may then be transferred into suitable process parameters for obtaining the desired beverage with the multipurpose beverage preparation machine 10.

As shown in FIG. 10, a user may select a beverage type 8a and a texture type 8b in step 1. Thereby, the beverage type may encompass a selection such as "coffee-based", "milk-based" and "chocolate-based" and may further comprises different subgroups for the respective beverages such as "espresso" or "Cappuccino Barista" for "coffee-based", "Latte macchiato" or "Flat white" for "milk based" and "Hot chocolate" for "chocolate-based".

The basic selection "texture type" or "character" 8b may comprise the options "liquid", "dense" and "texture", whereby the latter two relate to a beverage comprising an at least partial foamy structure and the first relates to a purely liquid beverage without any foam. The selection "texture type" preferably comprises a selection that leads to at least two, preferably at least three different foam structures of the resulting beverage.

Figure 11C:
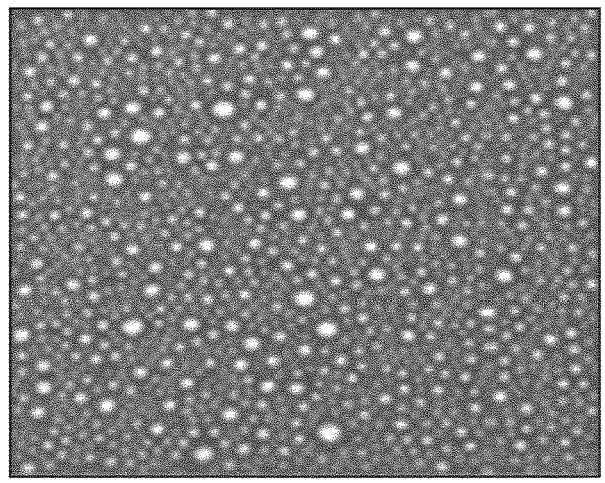
FIGS. 11a-11c relate to microscopic images of a foam created on the beverage prepared by the multipurpose beverage preparation machine with different process parameters.
Figure 11B:
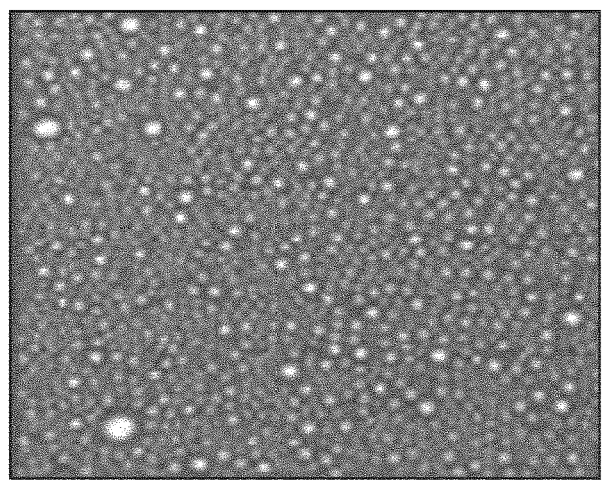
Figure 11A:
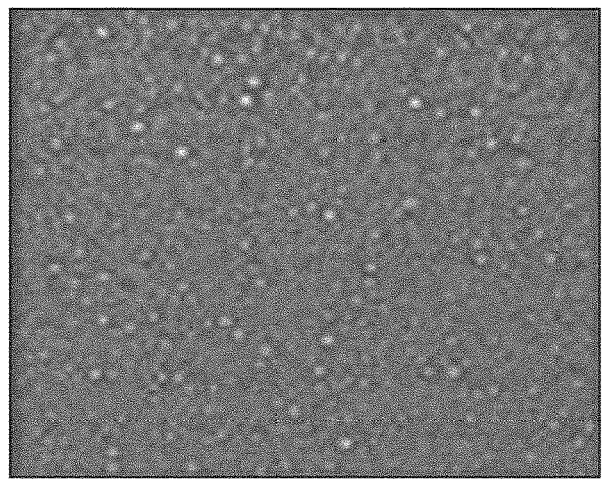

In a particular preferred embodiment, the computer program enables for a selection of three different foam types that differ in their type and/or aeration level of the resulting foam. For example, a first structure ("dense" or "Chantilly") may relate to a very dense foam texture and creamy taste with very small bubbles (see FIG. 11*a*). A second "texture" or "Barista" type of foam structure relates to foam similar to micro foam obtained with professional machines by a barista (see FIG. 11*b*). This foam structure is in particular suitable for making latte art. A third "Aero" foam structure relates to a very airy foam structure. Thereby, the bubbles are bigger than in the "Chantilly" and "Barista" type foam structure (see FIG. 11*c*).

In steps 2 and 3, a user may select ingredients and/or additives 8c that may be added to the resulting beverage. Examples for such ingredients are liquid milk, soluble coffee, chocolate, almond, blackberry, cinnamon, hazelnuts etc.

In steps 4 and 5, a user may select an accessory or insert type 8d for being used with the beverage preparation machine 10. Further, a desired cup type or cup size 8e of the receiving vessel may be selected by a user.

In step 6, the user may add additional information 39 such as recipe time, descriptive text, a name for the recipe, a photo or the like.

The provided basic selections 8 are converted into a corresponding combination of beverage process parameters 9 for the multipurpose beverage preparation machine 10 as previous described and stored on the memory unit 6 of the electronic device 1 and/or on the memory unit 25 of the machine 10 under the name of the recipe 34. The recipe 34 is then available for selection by a user and for beverage preparation with the machine 10 upon selection in the recipe library 31. The user may as well selectively upload to the remote resource 20a beverage preparation recipes 34 that are created with the computer program. The individual creations by the user may then be stored at the remote resource 20a and downloaded by other users. A user may thus share his personally created recipes 34 with other users of the computer program. Further, other users may rate the recipes 34 as previously described.

Figure 12:
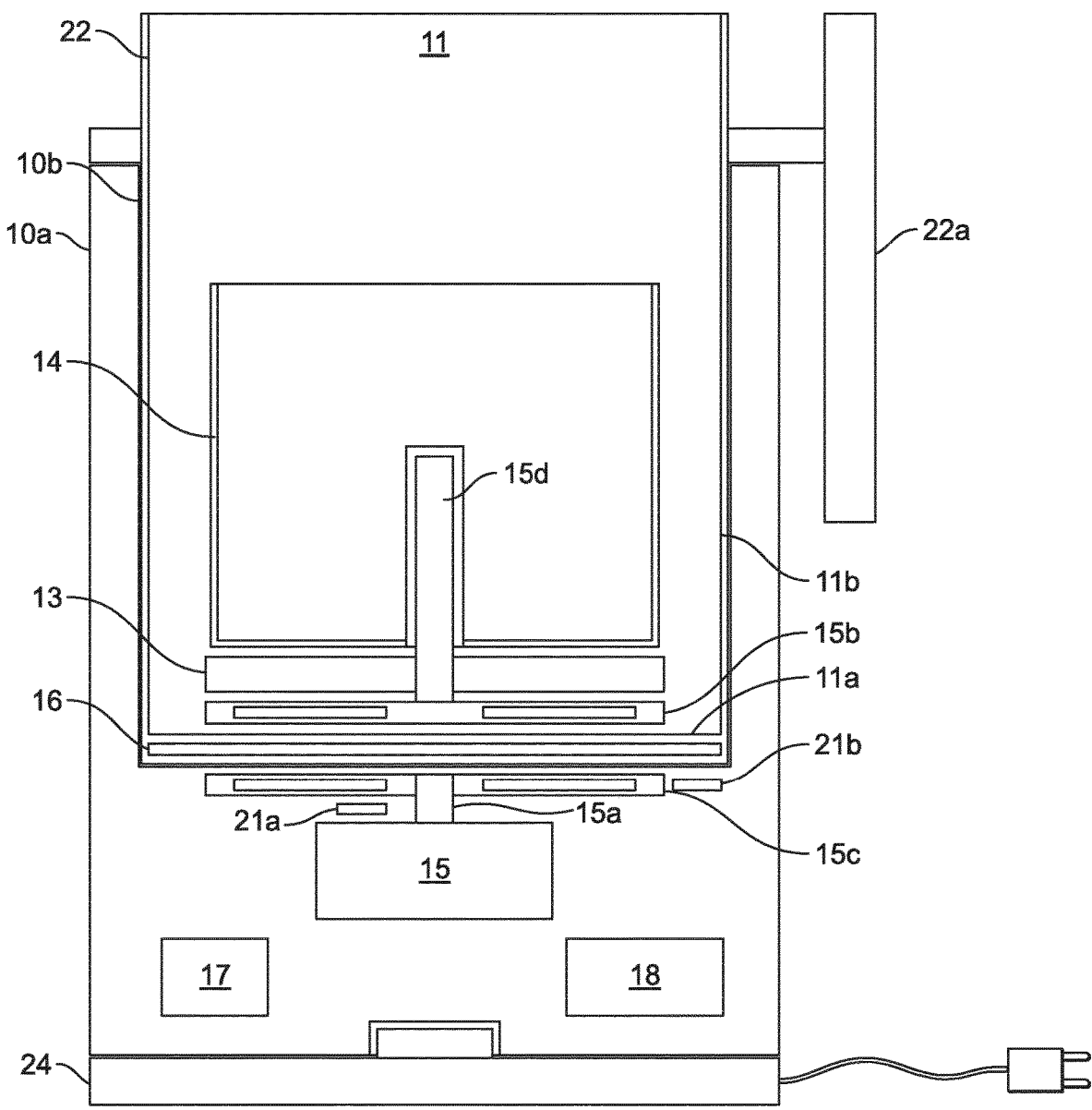
FIG. 12 is a sectional side view of the multipurpose beverage preparation machine according to FIG. 2 for a variant of the machine of FIG. 3.

In a variant of the embodiment of the beverage preparation machine shown in FIG. 3, a transmission of the rotating force from the motor 15 to the foaming and support inserts 13, 14 may be obtained by magnetic forces through a closed bottom of the beverage preparation chamber 11. FIG. 12 illustrates such a possible variant. A magnetically driven internal disc 15b positionable inside the chamber is driven by a magnetically driven external disc 15c directly connected to the motor 15 via a central shaft 15a. The foaming insert 13 can be locked to the internal disc 15b such as by press-fitting. The support insert 14 may also be supported or locked to the internal disc 15b such as via a central pin 15d fixed to the disc 15b. The bottom of the chamber 11a may comprise embedded heating means 16 or such heating means may be separate as in the embodiment according to FIG. 3.

TABLE 1

| Process parameters | Chantilly | Cold microfoam | Aero 3 improved, Latte Macchiatto | Cappuccino gourmand; Hot microfoam | Flat white | Hot chocolate | Mocha |
|---|---|---|---|---|---|---|---|
| Milk volume (ml) | 80 | 70 | 80 | 80 | 80 | 80 | 60 |
| Type of milk | UHT, 0%, Cremo | UHT, 2.5%, Cremo | UHT, 2.5%, Cremo | UHT, 2.5%, Cremo | UHT, 2.5%, Cremo | UHT, 2.5%, Cremo | UHT, 2.5%, Cremo |
| Coffee volume | | | | | | | 25 ml, Darkhan |
| Milk chocolate | | | | | | 3 pieces | 3 pieces |
| Initial Milk temperature ° C. | 4° C. | 4° C. | 4° C. | 4° C. | 4° C. | 4° C. | 4° C. |
| Type of wisk | Wavy, cut out | Wavy, cut out | Wavy, cut out | Wavy, cut out | Wavy, cut out | Basket | Basket |
| Phase 1 - RPM | 4000 | 2600 | 3650 | 2800 | 600 | 500 | 500 |
| Phase 1 - Acceleration (rpm/s) | 800 | 800 | 800 | 800 | 800 | 250 | 250 |
| Phase 1 - Duration | 15 | 50 | 5 | 30 | 30 | 15 | 15 |
| Phase 1 - Heating T° | Disabled | Disabled | Disabled | 61 | 70 | 70 | 60 |
| Phase 2 - RPM | 300 | N/A | 2620 | 1120 | 4000 | 1400 | 1400 |
| Phase 2 - Acceleration (rpm/s) | 100 | N/A | 730 | 730 | 1000 | 500 | 500 |
| Phase 2 - Duration | 15 | N/A | 30 | 10 | 30 | 15 | 15 |
| Phase 2 - Heating T° C. | Disabled | N/A | 70 | Disabled | Disabled | 70 | 68 |
| Phase 3 - RPM | N/A | N/A | N/A | N/A | N/A | 2800 | 2800 |
| Phase 3 - Acceleration (rpm/s) | N/A | N/A | N/A | N/A | N/A | 200 | 200 |

TABLE 1-continued

| Process parameters | Chantilly | Cold microfoam | Aero 3 improved, Latte Macchiatto | Cappuccino gourmand; Hot microfoam | Flat white | Hot chocolate | Mocha |
|---|---|---|---|---|---|---|---|
| Phase 3 - Duration | N/A | N/A | N/A | N/A | N/A | 15 | 15 |
| Phase 3 - Heating T° | N/A | N/A | N/A | N/A | N/A | 70 | 70 |

The invention claimed is:

1. A multipurpose beverage preparation machine comprising: a beverage preparation chamber configured for receiving a liquid; a processor configured for processing a beverage in the beverage preparation chamber; a motor configured for driving the processor in the beverage preparation chamber; a heater configured for heating the liquid in the beverage preparation chamber; a control unit configured to execute a beverage preparation process comprising control of the motor and control of the heater; the control unit being coupled to a network interface of the machine to receive beverage process parameters from an external electronic device, the external electronic device configured to provide the beverage process parameters to the control unit; wherein the processor comprises at least one foaming insert and at least one support insert configured for supporting solid ingredients, the at least one foaming insert and the at least one support being selectively and removably positionable within the beverage preparation chamber, the at least one foaming insert configured to enable foaming of the liquid in the beverage preparation chamber; and wherein the control unit is configured for actuating the motor and the heater based on at least a part of the received beverage process parameters; the at least one foaming insert and the support insert being configured for being individually or commonly coupled in rotation to the motor, and the motor is configured to selectively perform: (a) a first function, in which the motor drives the at least one foaming insert; (b) a second function, in which the motor drives the at least one support insert; and (c) a third function, in which the motor drives both of the at least one foaming insert and the at least one support insert; and the at least one support insert comprises apertures configured for the liquid to traverse the at least one support insert during actuation of the at least one support.

2. The multipurpose beverage preparation machine according to claim 1, wherein the control unit is operable to process the beverage process parameters comprising at least an actuation profile of the motor and a temperature profile of the heater.

3. The multipurpose beverage preparation machine according to claim 2, wherein the actuation profile and/or the temperature profile comprises at least two individual phases that are carried out in sequence during the beverage preparation process.

4. The multipurpose beverage preparation machine according to claim 2, wherein the actuation profile of the motor includes at least a rotation time, a rotational speed and an acceleration of the motor.

5. The multipurpose beverage preparation machine according to claim 1, wherein the control unit is operable to receive sensed parameters from at least one sensor of the beverage preparation machine and to control accordingly the heater and/or the motor to match the beverage process parameters provided by the external electronic device to the multipurpose beverage preparation machine.

6. The multipurpose beverage preparation machine according to claim 1, further comprising a display unit.

7. The multipurpose beverage preparation machine according to claim 1, wherein the network interface is a wireless interface.

8. The multipurpose beverage preparation machine according to claim 1, wherein the control unit is configured to operate the processor according to predefined beverage recipes from beverage parameters that are pre-stored in the control unit and new beverage recipes from beverage parameters which are transferred to the control unit from the external electronic device and stored in a memory of the control unit.

9. The multipurpose beverage preparation machine according to claim 5, wherein the at least one sensor comprises a temperature sensor.

10. The multipurpose beverage preparation machine according to claim 5, wherein the at least one sensor comprises a rotational speed sensor.

* * * * *